(12) United States Patent
Heschel et al.

(10) Patent No.: US 7,923,397 B2
(45) Date of Patent: Apr. 12, 2011

(54) SORBENT FOR THE DRY CLEANING OF WASTE GASES CHARGED WITH MERCURY AND PROCESS FOR THE PRODUCTION THEREOF

(75) Inventors: Wolfgang Heschel, Freiberg (DE); Bernd Meyer, Freiberg (DE); Maik Werner, Goslar (DE); Jürgen Wirling, Hürth (DE)

(73) Assignee: RWE Power Aktiengesellschaft, Essen (DE)

( * ) Notice: Subject to any disclaimer, the term of this patent is extended or adjusted under 35 U.S.C. 154(b) by 0 days.

(21) Appl. No.: 12/110,587

(22) Filed: Apr. 28, 2008

(65) Prior Publication Data

US 2008/0274874 A1    Nov. 6, 2008

(30) Foreign Application Priority Data

Apr. 27, 2007    (DE) .................. 10 2007 020 422

(51) Int. Cl.
B01J 29/04    (2006.01)
C01B 31/08    (2006.01)
(52) U.S. Cl. .......................... 502/60; 502/416
(58) Field of Classification Search .............. None
See application file for complete search history.

(56) References Cited

U.S. PATENT DOCUMENTS

| 1,744,341 | A |   | 1/1930 | Spencer et al. |
| 1,774,341 | A | * | 8/1930 | Von Halban et al. ......... 502/433 |
| 3,194,629 | A | * | 7/1965 | Dreibelbis et al. ............ 423/210 |
| 4,500,327 | A | * | 2/1985 | Nishino et al. ................. 95/134 |
| 2002/0072555 | A1 | * | 6/2002 | Brands .......................... 524/155 |
| 2008/0207443 | A1 | * | 8/2008 | Gadkaree et al. ............. 502/417 |

FOREIGN PATENT DOCUMENTS

| CA | 1197499 |   | 12/1985 |
| CA | 2036744 |   | 2/1992 |
| CA | 2036746 | A * | 2/1992 |
| DE | 3229396 |   | 2/1984 |
| DE | 283278 |   | 10/1990 |
| DE | 4012982 |   | 10/1991 |
| DE | 19717798 |   | 10/1998 |
| DE | 19936930 |   | 2/2001 |
| EP | 1020419 |   | 7/2000 |

OTHER PUBLICATIONS

Federov; Particle Size Distribution of Aluminum Oxide in the Combustion Products of Condensed Substances; Combustion, Explosion and Shock Waves; vol. 18, No. 1, pp. 16-19; 1982.*

* cited by examiner

*Primary Examiner* — Melvin C Mayes
*Assistant Examiner* — Guinever S Gregorio
(74) *Attorney, Agent, or Firm* — Grossman Tucker Perreault & Pfleger, PLLC

(57) ABSTRACT

Sorbent for the dry cleaning of waste gases charged with mercury and process for the production thereof. The sorbent includes as an adsorptively acting constituent for example activated carbons or activated cokes which are mixed with sulfur in powder form at ambient temperature, under the action of atmospheric oxygen. The sorbent is distinguished by a given ratio in respect of the median values of the grain size of the adsorptively operative constituent to the sulfur.

9 Claims, 1 Drawing Sheet

Figure 1:
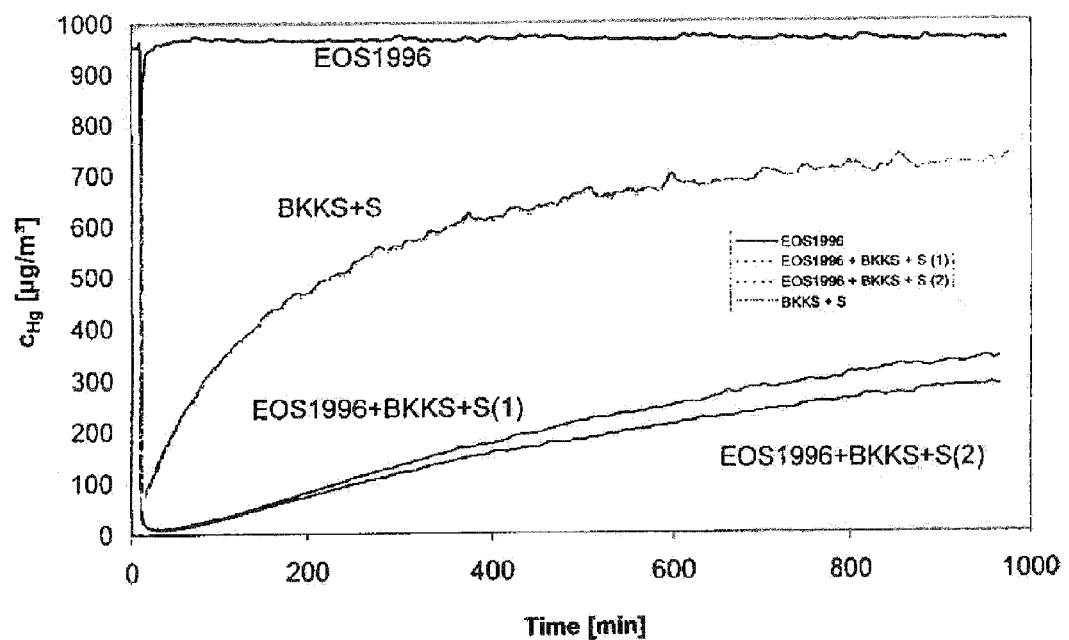

SORBENT FOR THE DRY CLEANING OF WASTE GASES CHARGED WITH MERCURY AND PROCESS FOR THE PRODUCTION THEREOF

The invention concerns a sorbent for the dry cleaning of waste gases charged with mercury, comprising at least one adsorptively acting constituent in the form of activated carbons, activated cokes, zeolites or the like, and powder elementary sulfur.

The use of sulfur-bearing substances or indeed the use of elementary sulfur for the separation of elementary mercury from waste gases from thermal processes such as for example from waste gases of refuse incinerators or from metallurgical or secondary-metallurgical procedures is basically known.

It is known for example from DE 199 36 930 A1, for the separation of metallic mercury from hot pyrolysis gases from waste substances, for mercury-binding substances to be introduced into the pyrolysis gas, which afford solid mercury compounds. They are separated off at fine dust filters. DE 199 36 930 refers to sulfur, sulfur-doped activated carbons, hearth furnace cokes, bentonites, zeolites, trasses and/or brick dusts as well as substances which give off sulfur such as sodium thiosulfate, sulfuric acid and hydrochloric acid, as mercury-binding substances.

In that respect, doping of the sorbents or impregnation thereof, as is mentioned for example in DE 199 36 930, is generally effected in such a way that elementary sulfur is added in powder form to the adsorbent and the mixture is treated over a number of hours at up to temperatures of 600° C. in an inert gas atmosphere. In that case the sulfur vapor produced penetrates the pore structure of the adsorbent and condenses therein (impregnation).

As an alternative to doping the adsorbents with sulfur or sulfur compounds, it is also known for sulfur in powder form and adsorptively operative substances to be added separately to the flow of waste gas. Such a procedure as is also described for example in DE 199 36 930 A1 is less satisfactory in terms of the degree of mercury separation that is to be achieved.

By way of example DE 32 29 396 discloses a process for the production of carbonaceous adsorption agents impregnated with elementary sulfur, which is distinguished in that carbonaceous adsorption agents are mixed with elementary sulfur and heated in a stationary or moving fill to temperatures of between 120° C. and 200° C., that temperature is maintained for a period of several hours, and the mixture is then cooled. With such a procedure the sulfur penetrates the pore structure of the adsorbent and condenses therein as, as is known, the melting temperature of sulfur is 119° C.

A serious disadvantage of that production process is that partial blockage of the pore system due to the deposited sulfur or the sulfur compounds occurs. The micropores are primarily affected by the blockage so that the adsorption capacity for the further harmful substances contained in the waste gas, in particular for polychlorinated dibenzodioxins and polychlorinated dibenzofurans, is greatly reduced. That phenomenon can be explained on the basis that the sulfur vapor produced during the thermal treatment condenses out, beginning in the finest pores, as the greatest vapor pressure reduction occurs in them (capillary effect).

Therefore the object of the invention is to provide a sorbent and a process for the production thereof, which is comparatively simple, which in particular requires little energy expenditure and which ensures a high level of rapid mercury removal from the waste gas.

According to the invention there is provided a sorbent for the dry cleaning of waste gases charged with mercury, comprising at least one adsorptively acting constituent in the form of activated carbons, activated cokes, zeolites or the like, and powder elementary sulfur, which is distinguished in that the constituents are in the form of a homogeneous mixture, wherein the ratio of the average grain sizes ($d_{50}$ median values) of the sulfur to the adsorptively operative constituent is between 1:2 and 1:20, preferably 1:2.5 and 1:5

The invention is based on the realisation that the mixture of the adsorptively acting constituents with the chemically acting constituents, that is to say with sulfur, is to be such that the adhesion forces between the sulfur dust particles and the adsorbent particles reliably prevent separation of the mixture. That eliminates impregnation of the adsorbent with sulfur, which is complicated and expensive in terms of energy, and in particular that avoids the disadvantage that this entails of blockage of the micropores of the adsorbent and the concomitant reduction in adsorption capability of the adsorbent. It has surprisingly been found that it is precisely with the above-mentioned ratio of the median values of the grain sizes of adsorptive constituents and sulfur that it is possible to achieve a particularly stable mixture, in the sense that separation of the mixture in the flow in flight does not occur.

The ratio of the median values of the constituents of the mixture is so selected that a comparatively large amount of sulfur particles accumulates on the adsorptively acting particles without the adsorption pore system being adversely affected in any way.

Desirably the average grain size of the sulfur is between 1 and 8 μm, preferably between 4 and 8 μm. The average grain size of the adsorptively operative constituent can be about 20 μm.

The sulfur content of the sorbent can be between 1 and 20 percent by mass, preferably it is between 1 and 7 percent by mass.

It is particularly desirable if a brown coal coke with an average grain size of about 20 μm is provided as the adsorptively operative constituent.

A particularly advantageous variant of the sorbent according to the invention is distinguished by an addition of dust from metallurgical or secondary-metallurgical processes. That process dust can include oxides and/or chlorides from the group of the elements comprising Al, Ca, Ci, Fe, K, Mg, Mn, Na, Pb, Si, Zn, Cr, Cu and Ti. Preferably the metals of the process dust are in the form of oxides, whereas sodium and potassium are preferably in the form of chlorides.

It has been found that, with a proportion of about 50% of such a process dust, with an average grain size of 1.5 μm, the mercury absorption capability of the sorbent is surprisingly increased.

The process for the production of the sorbent according to the invention is distinguished in that the adsorptive constituents are thoroughly mixed with the sulfur at a temperature of ≦119° C. and in the presence of atmospheric oxygen.

An advantageous variant of the process provides that mixing is effected approximately at atmospheric pressure.

Desirably the mixing operation is carried out without an additional application of heat, that is to say at ambient temperature.

The process according to the invention is distinguished in that careful mixing of the constituents is carried out at ambient temperature and approximately at atmospheric pressure in such a way that adhesion forces are produced between the sulfur dust particles and the adsorber particles without involving a simultaneous further reduction in size of one of the two components or without pore openings of the adsorbent being sealed off by a compression or shear loading on the mixture. In that respect the numerical ratio of the average grain size of sulfur, dust and adsorbent, for example in the form of brown coal coke, is of a given value which affords a mixture which is also sufficiently stable in the sense of resistance to separation of the mixture, by virtue of the adhesion forces between the particles.

The mixing duration is limited to the minimum value for achieving the maximum mixing quality. Mixtures in powder form produced in that way consisting of sulfur and activated carbon or activated carbon dust or sulfur and activated coke (brown coal hearth furnace coke) can be pneumatically conveyed without any problem and can be transferred elsewhere and are used without a thermal treatment directly in flying flow adsorber filter layer installations.

A suitable process for cleaning waste gases is for example flying flow adsorption, wherein the adsorbent in powder form is metered directly into the flow of waste gas and is then separated off together with the process dusts entrained in the flow of waste gas, in filter installations. The process according to the invention provides that the sulfur dust is placed in particulate form at the outer surface of the adsorbent particles. That provides that the sulfur is readily accessible to the mercury and the adsorption pore system as well as the feed pores of the adsorbent remain free. It can be shown that there is a relationship between the coating density of the particle surface with sulfur dust (number of sulfur particles), the grain size of adsorbent and sulfur and the sulfur content of the adsorbent. Table 1 summarises the calculated values for the statistical number of sulfur particles per adsorbent particle for different particle diameters of the sulfur dust. The size values involve the respective median value $d_{50}$ of the grain size distribution. It corresponds to the grain size in which the sum curve is of the value 50%. It can be seen from Table 1 for a sulfur content of the doped adsorbent of for example 10 percent by mass that, with a $d_{50}$ value of 20 μm for the adsorbent and 6 μm for the sulfur dust respectively, as a statistical average 2 sulfur particles are disposed on an adsorbent particle.

TABLE 1

Statistical number of sulfur particles per adsorbent particle

| Sulfur content [percent by mass] | $d_{50}$ value sulfur dust [μm] | | | |
|---|---|---|---|---|
| | 2 | 4 | 6 | 8 |
| 1 | 4.8 | 0.6 | 0.2 | 0.1 |
| 2 | 9.7 | 1.2 | 0.4 | 0.2 |
| 5 | 25.0 | 3.1 | 0.9 | 0.4 |
| 10 | 52.8 | 6.6 | 2.0 | 0.8 |

TABLE 1-continued

Statistical number of sulfur particles per adsorbent particle

| Sulfur content [percent by mass] | $d_{50}$ value sulfur dust [μm] | | | |
|---|---|---|---|---|
| | 2 | 4 | 6 | 8 |
| 20 | 118.8 | 14.8 | 4.4 | 1.9 |
| 50 | 363* (43**) | 59.4 | 17.6 | 7.4 |

$d_{50}$ value adsorbent: 20 μm; bulk density adsorbent: 0.95 g/cm³, sulfur: 2 g/cm³,
*Number of particles for a monoparticle layer; **correspond. sulfur content.

The smaller the sulfur particles, the correspondingly greater is the specific outside surface thereof and the correspondingly more effective is mercury separation. At the same time, with a predetermined sulfur content, there are more sulfur particles on the surface of the adsorbent particle. It has a favorable effect that fine sulfur particles adhere to the adsorbent particle more strongly than larger particles. It has been found that a $d_{50}$ ratio of sulfur to adsorbent of 1:2.5 to 1:5 is desirable.

FIG. 1: FIG 1 shows the variation in respect of time of the Hg exit concentration from the adsorber, the uppermost graph showing the variation in concentration of the pure process dust (EOS1996). The graph therebeneath shows the variation in concentration of the sulfur-doped coke sample. The graphs shown therebelow illustrate the variations in concentration of the sulfur-doped coke dust sample to which process dust of the composition shown in Table 3 was added in a ratio of 50:50. The adsorber temperature was 120° C. in that case.

EXAMPLE 1

The following Example describes the mode of operation of a sorbent which is distinguished from the sorbent according to the invention in that the ratio of the median values, that is provided in accordance with the invention, was not observed.

2 kg of brown coal coke of a grain size<4 mm was comminuted with 0.105 kg of sulfur pellets (about 6 mm) corresponding to 5 percent by mass of sulfur in a drum mill (20 kg grinding body, 70 rpm) for a period of 100 minutes and in so doing was mixed. The grain size distribution of the mixture, the saturation loading with 1, 3-dichlorobenzene at 20° C. and the loading with elementary mercury were measured in a fixed bed adsorber. The measurement conditions in respect of Hg adsorption were as follows: entry concentration of the elementary mercury 980 μg/m³; adsorber temperature 90° C.; vacuum gas speed 1.7 cm/s; carrier gas with 14% by volume of oxygen, 0.4% by volume of water vapor and the balance nitrogen. The sample in powder form was introduced into the adsorber in the form of 3 individual layers each of 0.5 g, separated by glass wool felts. The sandwich structure of the adsorption layer ensures a uniform flow of the sample in powder form therethrough.

A $d_{50}$ value of 7 μm for the sulfur-doped coke dust was determined after comminution in the drum mill by means of a laser granulometer (Helos, from Sympatec). The mean loading with mercury was 255 μg/g after 12 hours. The mercury was 90.6% removed from the gas flow. The loading with 1,3-dichlorobenzene was reduced from 18.4 percent by mass for the untreated hearth furnace coke to 11.2 percent by mass for the sulfur-doped coke sample (reduction by 39% in relative terms), which is to be attributed to the blockage of micropores which occurred by the loading in the mill.

EXAMPLE 2

According to the Invention

Granular sulfur was comminuted in a disk ball mill to a $d_{50}$ value of 7 µm. 5 parts by weight of the sulfur dust was homogeneously mixed with 95 parts by weight of brown coal coke dust ($d_{50}$ value of 20 µm) in an overhead mixer. The sulfur content of the coke sample doped in accordance with the invention was 5 percent by mass. The mean loading with mercury (conditions as in Example 1) was 270 µg/g after 12 hours. The mercury was 96% removed from the gas flow. Sample portions of the mixture were subjected to temperatures of up to 140° C. over a period of 4 hours in a drying cabinet. The 1,3-DCB equilibrium loading was determined in respect of the samples, as in Example 1. It is to be concluded from Table 2 that a thermal post-treatment of the coke sample doped in accordance with the invention does not lead to any adverse effect on the adsorption pore system.

TABLE 2

1,3-DCB saturation loading (20° C.)

| Temperature ° C. | 1,3-DCB loading Percent by mass |
| --- | --- |
| 20 | 24.35 |
| 80 | 24.59 |
| 100 | 24.27 |
| 120 | 24.12 |
| 140 | 23.81 |

EXAMPLE 3

According to the Invention

Granular sulfur was comminuted in a disk ball mill to a $d_{50}$ value of 7 µm. 5 parts by weight of the sulfur dust was homogeneously mixed with 95 parts by weight of brown coal coke dust ($d_{50}$ value of 20 µm) in an overhead mixer. The sulfur content of the coke sample doped in accordance with the invention was 5 percent by mass. The process then involved adding a process dust from scrap recycling in accordance with the arc furnace process to the coke dust sample doped with 5 percent by mass, in a ratio of 50:50 parts by weight. The process dust had a $d_{50}$ value of 1.5 µm and an element composition as set forth in Table 3. The metals were present in oxidic form, potassium and sodium as chlorides.

Mercury absorption was determined by the sample. Unlike Example 1 a temperature of 120° C. was adopted. The result is shown in graph form in FIG. 1 as the variation in respect of time of the exit concentration of the solid bed adsorber (breakthrough curve). Shown for comparison purposes are the variations in concentration of the sulfur-doped coke sample (equal absolute coke mass) and the pure process dust. It is to be concluded from FIG. 1 that mercury absorption is promoted by the presence of the process dust.

TABLE 3

| Element contents (>500 ppmw) in the process dust | | | | | | |
| --- | --- | --- | --- | --- | --- | --- |
| Al 6500 | Ca 62700 | Ci 28000 | Fe 233000 | K 14400 | Mg 11800 | Mn 23000 |
| Na 10600 | Pb 32400 | Si 17000 | Zn 258000 | Cr 5200 | Cu 2430 | Ti 570 |

The invention claimed is:

1. A sorbent for the dry cleaning of waste gases charged with mercury, comprising at least one adsorptively acting constituent in the form of loose particles of activated carbons, activated cokes and zeolites, said particles having pores including walls, and a chemically active constituent comprising particles of elementary sulfur, wherein the constituents are in the form of a homogeneous mixture of loose particles at ambient temperature, wherein the sulfur particles reside at the outer surface of the adsorptively acting constituent particles and said adsorptively acting constituent is not impregnated with sulfur and said sulfur does not reside on the walls of said pores wherein said pores are not sealed off by said sulfur, wherein the ratio of the average grain sizes ($d_{50}$ median values) of the sulfur particles to the adsorptively operative constituent particles is between 1:2 and 1:20 wherein the sulfur content of the sorbent is between 1 and 20 percent by mass and the average grain size of the sulfur is between 1 and 8 µm and the average grain size of the adsorptively operative constituent is about 20 µm.

2. A sorbent as set forth in claim 1 characterised in that the sulfur content of the sorbent is between 1 and 7 percent by mass.

3. A sorbent as set forth in claim 1 characterised in that a brown coal coke with an average grain size of about 20 µm is provided as the adsorptively operative constituent.

4. A sorbent as set forth in claim 1 characterised by an addition of dust from metallurgical or secondary-metallurgical processes.

5. A sorbent as set forth in claim 4 characterised in that the process dust contains oxides and/or chlorides from the group of the elements comprising Al, Ca, Ci, Fe, K, Mg, Mn, Na, Pb, Si, Z, Cr, Cu and Ti.

6. A sorbent as set forth in claim 4 characterised in that the average grain size of the process dust is about 1.5 µm.

7. A process for the production of a sorbent as set forth in claim 1 characterised in that the adsorptive constituents are thoroughly mixed with the sulfur at a temperature of ≦119° C. and in the presence of atmospheric oxygen.

8. A process as set forth in claim 7 characterised in that mixing is effected approximately at atmospheric pressure.

9. A process as set forth in claim 7 characterised in that the mixing operation is carried out without an additional application of heat, that is to say at ambient temperature.

* * * * *